US012118945B2

(12) United States Patent
Lee et al.

(10) Patent No.: US 12,118,945 B2
(45) Date of Patent: Oct. 15, 2024

(54) DISPLAY APPARATUS

(71) Applicant: LG Display Co., Ltd., Seoul (KR)

(72) Inventors: Won-Hee Lee, Paju-si (KR); Ji-Woong Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/545,507

(22) Filed: Dec. 19, 2023

(65) Prior Publication Data

US 2024/0257761 A1 Aug. 1, 2024

(30) Foreign Application Priority Data

Jan. 27, 2023 (KR) ........................ 10-2023-0010510

(51) Int. Cl.
*G09G 3/3258* (2016.01)

(52) U.S. Cl.
CPC ..... *G09G 3/3258* (2013.01); *G09G 2300/026* (2013.01); *G09G 2300/0861* (2013.01); *G09G 2320/0626* (2013.01); *G09G 2320/0673* (2013.01); *G09G 2330/021* (2013.01); *G09G 2360/16* (2013.01)

(58) Field of Classification Search
CPC ............. G09G 3/3258; G09G 2300/26; G09G 2300/0861; G09G 2320/0626; G09G 2320/0673; G09G 2330/021; G09G 2360/16
See application file for complete search history.

(56) References Cited

U.S. PATENT DOCUMENTS

2017/0352313 A1* 12/2017 Miyake ................ G09G 3/3258
2017/0352329 A1* 12/2017 Imai ......................... G09G 3/36
2017/0352332 A1* 12/2017 Nakao ...................... G09G 5/02
2017/0353659 A1* 12/2017 Hoshina ................ G06F 3/1423
2017/0353704 A1* 12/2017 Su .......................... G09G 5/005

* cited by examiner

*Primary Examiner* — Sejoon Ahn
(74) *Attorney, Agent, or Firm* — Birch, Stewart, Kolasch & Birch, LLP

(57) ABSTRACT

A display apparatus includes a data driving portion having a plurality of driving portions corresponding to a plurality of split regions of a display panel, a gamma voltage portion providing a same gamma voltage set to the plurality of driving portions, and a data processing portion including a data adjustment portion and a maximum dimming signal extraction portion. The data adjustment portion can process a plurality of input image data corresponding to the plurality of split regions to output a plurality of output image data to the plurality of driving portions, and the maximum dimming signal extraction portion can provide a maximum dimming signal among a plurality of dimming signals for the plurality of split regions to the gamma voltage portion.

13 Claims, 6 Drawing Sheets

DISPLAY APPARATUS

CROSS REFERENCE TO RELATED APPLICATIONS

The present application claims priority to Korean Patent Application No. 10-2023-0010510 filed in Republic of Korea on Jan. 27, 2023, which is hereby expressly incorporated by reference into the present application.

BACKGROUND

Field of the Invention

The present disclosure relates to a display apparatus with reduced manufacturing costs and power consumption.

Discussion of the Related Art

As our information society develops, demand for display apparatuses for displaying images has increased in various forms. Recently, various flat display apparatuses such as organic light emitting display apparatuses and liquid crystal display apparatuses have been used.

The organic light emitting display apparatus has been widely used because it has advantages of small size, light weight, thinness, and low-power driving.

The organic light emitting display apparatus have been used as a means of displaying information in automobiles. The organic light emitting display apparatus for an automobile divides a screen to provide an instrument panel screen in front of a driver, a passenger screen in front of a passenger, and a center information screen in a center area of the automobile.

Meanwhile, in order to individually control luminance (or brightness) of the divided screens, a plurality of gamma voltage circuits that individually drive the divided screens are provided. Furthermore, as the plurality of gamma voltage circuits are used, image data is separated into the divided screens and processed with individual algorithms, thereby increasing the size of the data processing circuit and the number of calculations used in the process.

Therefore, the cost of circuit components used in the display apparatus can increase and power consumption by the display apparatus can increase.

SUMMARY OF THE DISCLOSURE

Accordingly, the present disclosure is directed to a display apparatus that substantially obviates one or more of the problems due to limitations and disadvantages of the related art.

An advantage of the present disclosure is to provide a display apparatus which can improve a cost of circuit components and power consumption in a screen-split type display apparatus.

Additional features and advantages of the disclosure will be set forth in the description which follows, and in part will be apparent from the description, or can be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display apparatus includes a display panel including a plurality of split regions defined by dividing a screen; a data driving portion including a plurality of driving portions respectively corresponding to the plurality of split regions; a gamma voltage portion providing a same gamma voltage set to the plurality of driving portions; and a data processing portion that includes a data adjustment portion which processes a plurality of input image data respectively corresponding to the plurality of split regions to output a plurality of output image data to the plurality of driving portions, and a maximum dimming signal extraction portion which provides a maximum dimming signal among a plurality of dimming signals that respectively set luminances of the plurality of split regions to the gamma voltage portion, wherein the data adjustment portion converts a luminance gain of each of the plurality of split regions calculated based on the maximum dimming signal into a data gain, and applies each data gain to each of the plurality of input image data.

In another aspect, a display apparatus includes a display panel including a plurality of split regions defined by dividing a screen; a data driving portion including a plurality of driving portions respectively driving the plurality of split regions; a gamma voltage portion providing a same gamma voltage set to the plurality of driving portions; and a data processing portion that provides a maximum dimming signal among a plurality of dimming signals that respectively correspond to the plurality of split regions to the gamma voltage portion, and that in a luminance split mode where at least two of the plurality of dimming signals are different from each other, applies each data gain to an input image data of each of the plurality of split regions to output a plurality of output image data to the plurality of driving portions, wherein the data processing portion converts a luminance gain of each of the plurality of split regions calculated based on the maximum dimming signal into the data gain according to a luminance-data gamma value relationship.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE EMBODIMENTS

Figure 1:
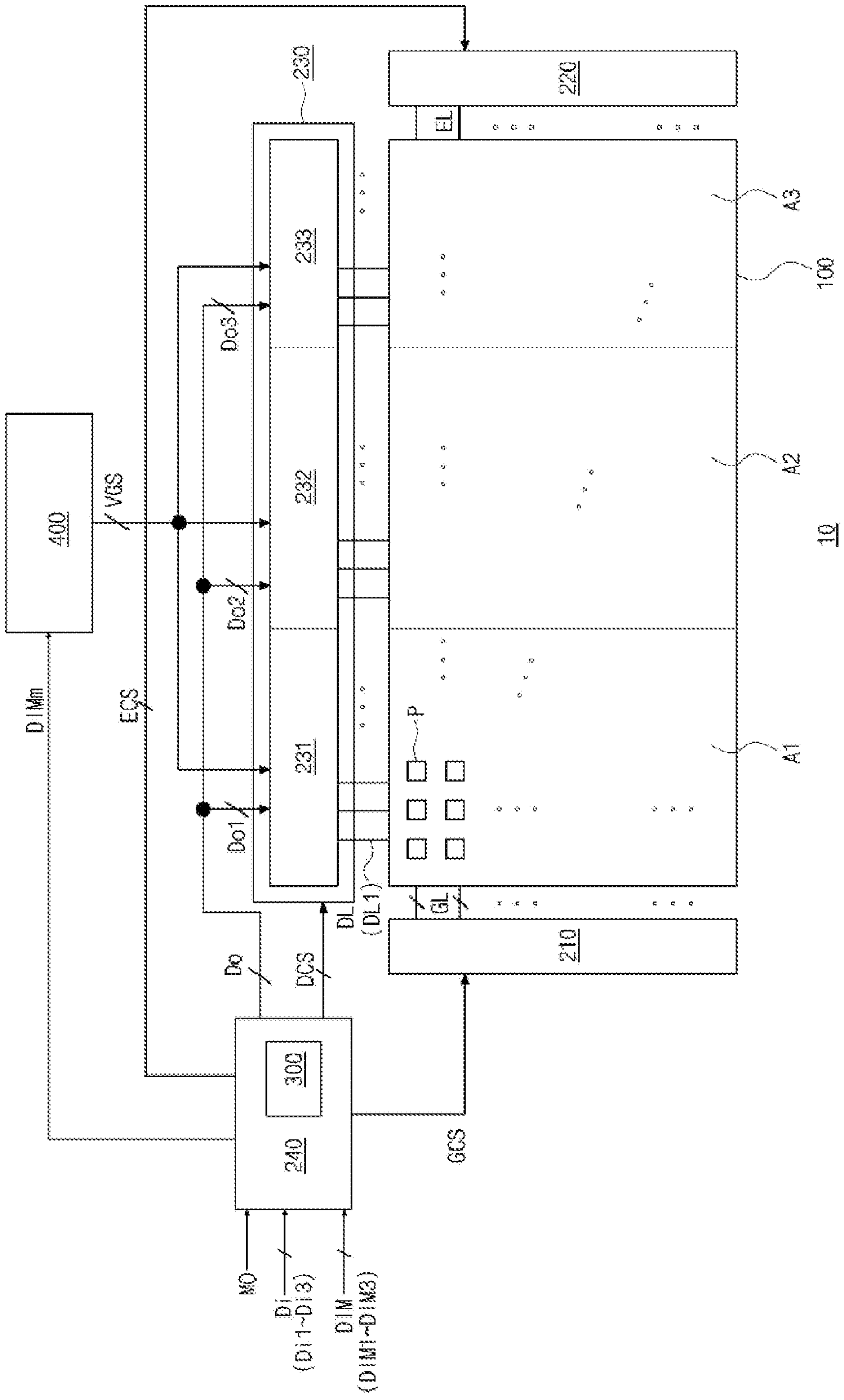
FIG. 1 is a view schematically illustrating a display apparatus according to an embodiment of the present disclosure.

Advantages and features of the present disclosure and methods of achieving them will be apparent with reference to the embodiments described below in detail with the accompanying drawings. However, the present disclosure is not limited to the embodiments disclosed below, but can be realized in a variety of different forms, and only these embodiments allow the present disclosure to be complete. The present disclosure is provided to fully inform the scope of the disclosure to the skilled in the art of the present disclosure, and the present disclosure can be defined by the scope of the claims.

The shapes, sizes, proportions, angles, numbers, and the like disclosed in the drawings for explaining the embodiments of the present disclosure are illustrative, and the present disclosure is not limited to the illustrated matters. The same reference numerals refer to the same components throughout the description.

Furthermore, in describing the present disclosure, if it is determined that a detailed description of the related known technology unnecessarily obscure the subject matter of the present disclosure, the detailed description thereof can be omitted. When 'comprising', 'including', 'having', 'consisting', and the like are used in this specification, other parts can be added unless 'only' is used. When a component is expressed in the singular, cases including the plural are included unless specific statement is described.

In interpreting the components, even if there is no separate explicit description, it is interpreted as including a margin range.

In the case of a description of a positional relationship, for example, when the positional relationship of two parts is described as 'on', 'over', 'above', 'below', 'beside', 'under', and the like, one or more other parts can be positioned between such two parts unless 'right' or 'directly' is used.

In the case of a description of a temporal relationship, for example, when a temporal precedence is described as 'after', 'following', 'before', and the like, cases that are not continuous can be included unless 'directly' or 'immediately' is used.

In describing components of the present disclosure, terms such as first, second and the like can be used. These terms are only for distinguishing the components from other components, and an essence, order, order, or number of the components is not limited by the terms. Further, when it is described that a component is "connected", "coupled" or "contact" to another component, the component can be directly connected or contact the another component, but it should be understood that other component can be "interposed" between the components.

Respective features of various embodiments of the present disclosure can be partially or wholly connected to or combined with each other and can be technically interlocked and driven variously, and respective embodiments can be independently implemented from each other or can be implemented together with a related relationship.

Hereinafter, embodiments of the present disclosure are described in detail with reference to the drawings. All the components of each display apparatus according to all embodiments of the present disclosure are operatively coupled and configured. Meanwhile, in the following embodiments, the same and like reference numerals are assigned to the same and like components, and detailed descriptions thereof can be omitted or may be briefly provided.

Figure 2:
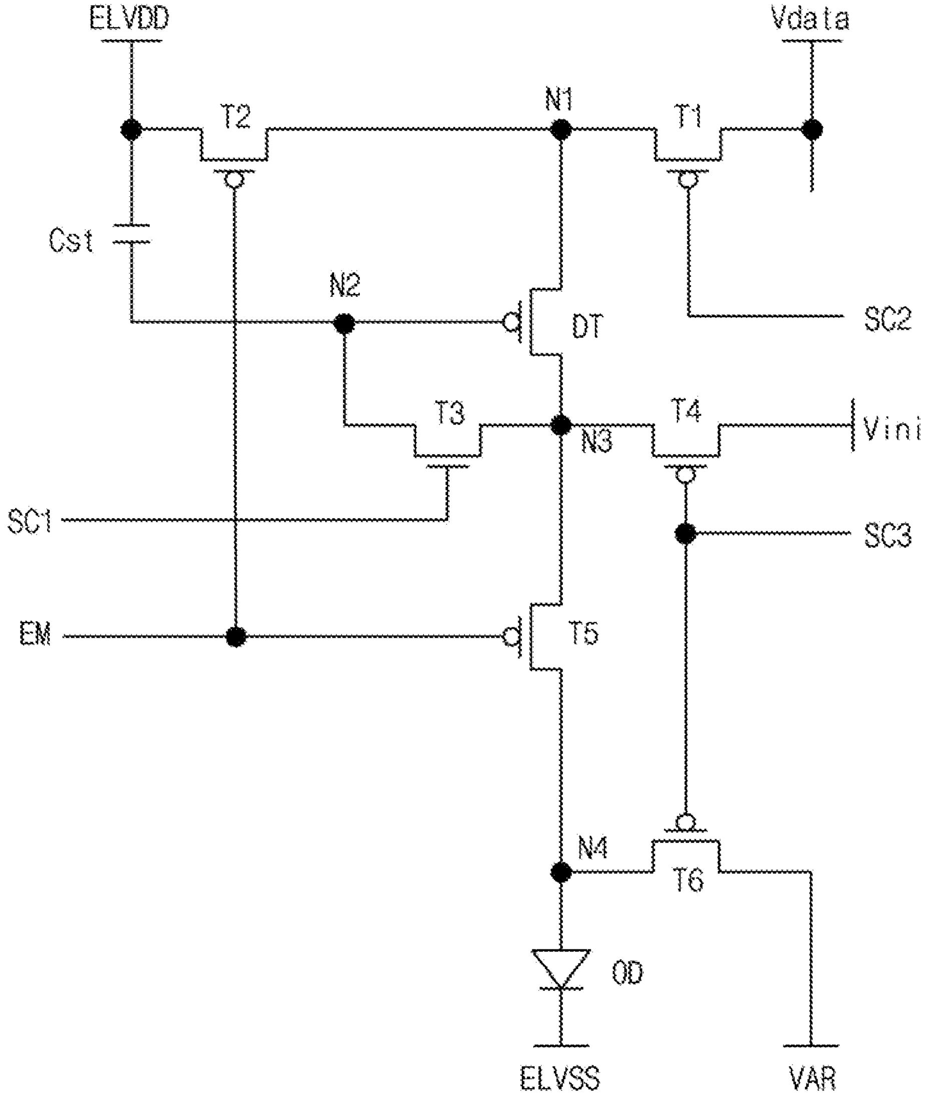
FIG. 2 is a circuit diagram schematically illustrating an example of a pixel according to an embodiment of the present disclosure.
Figure 3:
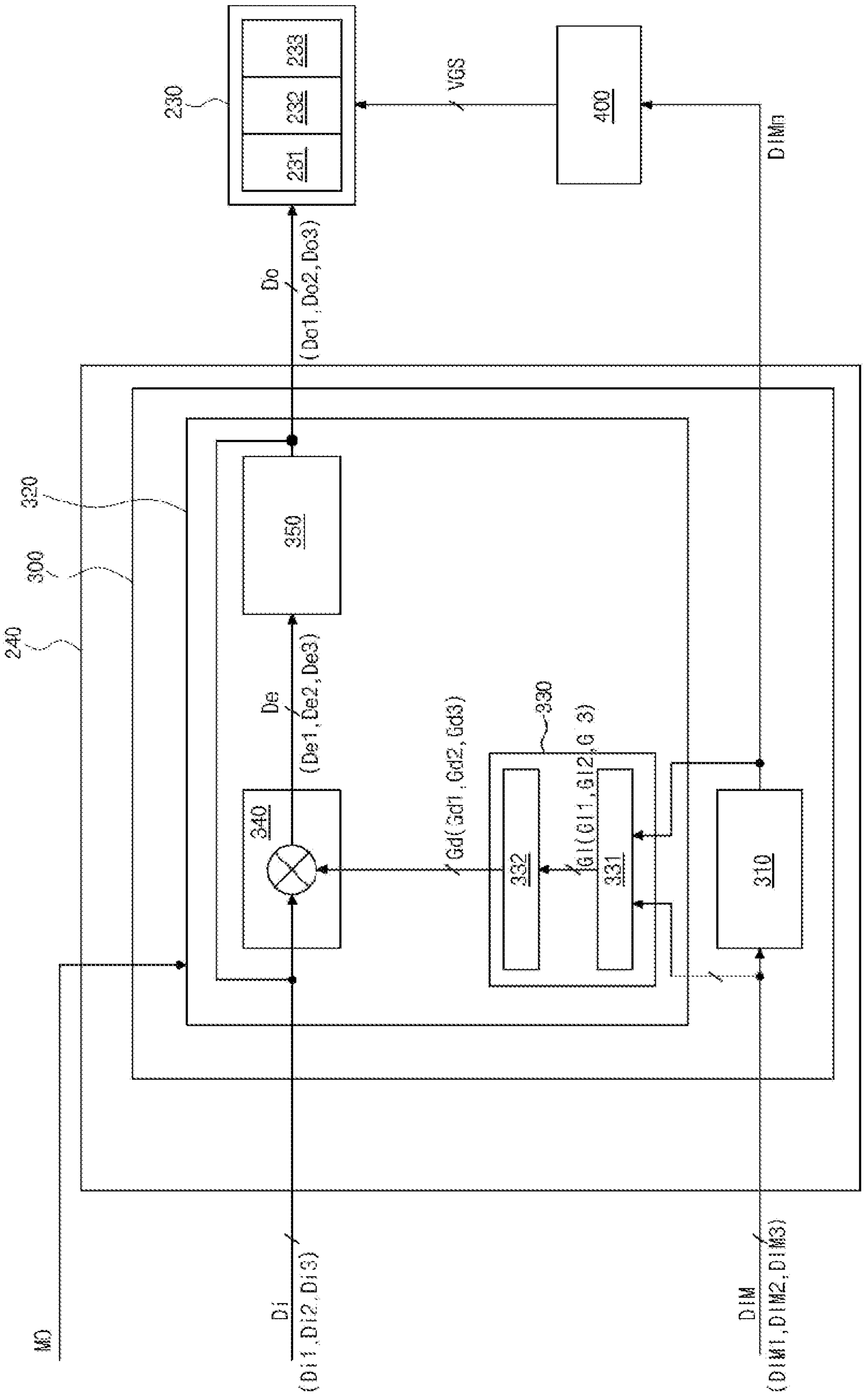
FIG. 3 is a block diagram schematically illustrating a configuration of a data processing portion of a display apparatus according to an embodiment of the present disclosure.

FIG. 1 is a view schematically illustrating a display apparatus according to an embodiment of the present disclosure. FIG. 2 is a circuit diagram schematically illustrating an example of a pixel according to an embodiment of the present disclosure. FIG. 3 is a block diagram schematically illustrating a configuration of a data processing portion of a display apparatus according to an embodiment of the present disclosure.

Prior to a detailed description, a display apparatus 10 of this embodiment can be a display apparatus among all types of display apparatuses to which a screen-split type is applied, including an organic light emitting display apparatus and a liquid crystal display apparatus.

Meanwhile, for convenience of explanation, in this embodiment, a case in which an organic light emitting display apparatus is used as the display apparatus 10 is taken as an example.

Referring to FIGS. 1 to 3, the display apparatus 10 of this embodiment can include a display panel 100, and a driving circuit portion that drives the display panel 100.

The driving circuit portion can include, for example, a gate driving portion (or gate driving circuit) 210, an emission driving portion (or emission driving circuit) 220, a data driving portion (or data driving circuit) 230, a timing control portion (or timing control circuit) 240, and a gamma voltage portion (or gamma voltage circuit) 400.

The display panel 100 can be configured in a screen-split type, and a screen (or display region or active region) of the display panel 100 can be divided into a plurality of (or J (which is a natural number of 2 or more)) split regions (or regions or split screens) A1 to A3.

In this embodiment, for convenience of explanation, an example is taken where the screen of the display panel 100 is divided into three and configured with first to third split regions A1 to A3 which are separated from each other.

In addition, the first to third split regions A1 to A3 can be arranged along one direction, for example, along a horizontal direction. However, other directions can be used.

This display panel 100 can be used as, for example, a display panel for automobile (e.g., various types of vehicles, etc.), but is not limited thereto and can be used as a display panel in other fields.

Meanwhile, when used as the display panel 100 for automobile, for example, the first split region A1 located on the left of the drawing is used as an instrument panel screen in front of a driver, the second split region A2 located in the center of the drawing is used as a center information screen, and the third split region A3 located on the right of the drawings is used as a passenger screen in front of a passenger. However, the split regions can have a different configuration, and the number of split regions can vary.

As such, the first to third split regions A1 to A3, which are used as separate screens, can be configured to allow individual luminance (or brightness) adjustment (or setting), and this is explained later in more detail.

The display panel 100 of the screen-split type as above can be provided with pixels P arranged in a matrix form along a plurality of horizontal lines (or row lines) and a plurality of vertical lines (or column lines) on a substrate.

An image can be displayed on the screen of the display panel 100 through light output from the plurality of pixels P.

Here, the plurality of pixels P can include pixels for displaying different colors, for example, but not limited to, red, green, and blue pixels that display red, green, and blue, respectively. Each of the plurality of pixels P can include an organic light emitting element, for example, a light emitting diode OD shown in FIG. 2. In this case, the display panel 100 can be an organic light emitting display panel.

In the display panel 100, various signal lines that transmit driving signals for driving the pixels P can be formed on the substrate.

In this regard, for example, a plurality of data lines DL transmitting data signals (or data voltages), which are image signals, can extend along the vertical direction and be connected to the pixels P of the corresponding vertical lines.

Here, for convenience of explanation, the data line DL arranged in the first split region A1 is referred to as a first data line DL1, the data line DL arranged in the second split region A2 is referred to as a second data line DL2, and the data line DL arranged in the third split region A3 is referred to as a third data line DL3.

The first to third data lines DL1 to DL3 can transmit the data signals to the pixels P arranged in the corresponding first to third split regions A1 to A3.

In addition, gate lines GL transmitting gate signals (or gate voltages) can extend along the horizontal direction and be connected to the pixels P of the corresponding horizontal lines. Further, emission lines (or emission control lines) EL transmitting emission control signals (or emission control voltages) can extend along the horizontal direction and be connected to the pixels P of the corresponding horizontal lines.

In addition to the data line DL, gate line GL, and emission line EL, other signal lines can be provided.

The pixels P can be defined by the data lines DL, gate lines GL, and emission lines EL that intersect each other.

Each pixel P can include the light emitting diode OD as a light emitting element, and a plurality of transistors and at least one capacitor for driving the light emitting diode OD.

Meanwhile, in this embodiment, for convenience of explanation, as shown in FIG. 2, a 7TIC structure in which the pixel P is provided with seven transistors T1 to T6 and DT and one capacitor Cst is taken as an example. Further, in FIG. 2, the pixel P located on a $n^{th}$ horizontal line is taken as an example.

Referring to FIG. 2, the pixel P can include a first transistor T1 to a sixth transistor T6, which are a plurality of switching transistors, a driving transistor DT, a storage capacitor Cst, and the light emitting diode OD.

Meanwhile, in FIG. 2, a case in which the first, second, fourth, fifth, and sixth transistors T1, T2, T4, T5, and T6 are formed of P-type transistors, the third transistor T3 is formed of an N-type transistor, and the driving transistor DT is formed of a P-type transistor is taken as an example, but not limited thereto.

The first to sixth transistors T1 to T6 and the driving transistor DT can include semiconductors made of the same material or can include semiconductors made of different materials. In this regard, for example, at least some of the first to sixth transistors T1 to T6 and the driving transistor DT can include one of a crystalline silicon layer, an oxide semiconductor layer, and an amorphous semiconductor layer.

Meanwhile, an oxide semiconductor has excellent off-current characteristics and can be suitable for a switching transistor, so that at least one of the first to sixth transistors T1 to T6 can include an oxide semiconductor layer. Crystalline silicon has excellent mobility, so that the driving transistor DT can include a crystalline silicon layer.

The gate signal provided to the $n^{th}$ horizontal line in FIG. 2 can be output from a $n^{th}$ stage of the gate driving portion 210. For example, three gate signals can be provided to the $n^{th}$ horizontal line, and for convenience of explanation, the three gate signals are referred to as first, second, and third gate signals SC1, SC2, and SC3. In this case, three gate lines GL for transmitting the three gate signals can be disposed on the $n^{th}$ horizontal line.

A gate of the first transistor T1 can be supplied with the second gate signal SC2. A source of the first transistor T1 can receive the data voltage Vdata transmitted through the corresponding data line DL. A drain of the first transistor T1 can be connected to a source of the driving transistor DT at a first node N1. The first transistor T1 can be turned on by the second gate signal SC2 and supply the data voltage Vdata to the source of the driving transistor DT.

A gate of the second transistor T2 can receive the emission control signal EM of the corresponding horizontal line. A source of the second transistor T2 can receive a high potential driving voltage ELVDD. A drain of the second transistor T2 can be connected to the first node N1. This second transistor T2 can be turned on by the emission control signal EM to supply the high potential driving voltage ELVDD to the source of the driving transistor DT.

A gate of the third transistor T3 can receive the first gate signal SC1. A source of the third transistor T3 can be connected to the drain of the driving transistor DT at a third node N3. A drain of the third transistor T3 can be connected to the gate of the driving transistor DT at a second node N2. The third transistor T3 can be turned on by the first gate signal SC1, so that a threshold voltage of the driving transistor DT can be sampled.

A gate of the fourth transistor T4 can receive the third gate signal SC3. A source of the fourth transistor T4 can receive an initialization voltage Vini. A drain of the fourth transistor T4 can be connected to the third node N3. The fourth transistor T4 can be turned on by the third gate signal SC3 and supply the initialization voltage Vini to the drain of the driving transistor DT.

A gate of the fifth transistor T5 can receive the emission control signal EM. A source of the fifth transistor T5 can be connected to the third node N3. A drain of the fifth transistor T5 can be connected to an anode of the light emitting diode OD at a fourth node N4. The fifth transistor T5 can be turned on by the emission control signal EM to provide a driving current (or emission current) to the anode of the light emitting diode OD.

A gate of the sixth transistor T6 can receive the third gate signal SC3. As another example, the gate of the sixth transistor T6 can receive a third gate signal of the next horizontal line. A source of the sixth transistor T6 can receive an anode reset voltage VAR. A drain of the sixth transistor T6 can be connected to the anode of the light emitting diode OD at the fourth node N4. The sixth transistor T6 can be turned on by the third gate signal SC3 to supply the anode reset voltage VAR to the anode of the light emitting diode OD.

The gate of the driving transistor DT can be connected to the drain of the third transistor T3 at the second node N2. The drain of the driving transistor DT can be connected to the source of the third transistor T3 and the source of the fifth transistor T5 at the third node N3. The source of the driving transistor DT can be connected to the drain of the first transistor T1 and the drain of the second transistor T2 at the first node N1. The driving transistor DT can be turned on according to the data voltage Vdata and allow the driving current to flow to the light emitting diode OD.

A first electrode of the storage capacitor Cst can be supplied with the high potential driving voltage ELVDD. A second electrode of the capacitor Cst can be connected to the gate of the driving transistor DT at the second node N2. The storage capacitor Cst can store the voltage of the gate of the driving transistor DT.

The anode of the light emitting diode OD can be connected to the drain of the fifth transistor T5 and the drain of the sixth transistor T6 at the fourth node N4. A cathode of the light emitting diode OD can receive a low potential driving voltage ELVSS. The light emitting diode OD can emit light with a luminance corresponding to the driving current provided through the driving transistor DT.

The 7T1C structure of the pixel P described above is an example, and the pixel P of this embodiment can have a different structure.

Referring again to FIG. 1, the gate driving portion 210 can receive a gate control signal GCS from the timing control portion 240, generate the gate signals, and sequentially apply the gate signal to the plurality of gate lines GL. For example, the gate voltages can be sequentially output in the vertical direction from the top to bottom in the drawing.

The gate driving portion 210 can be configured to include at least one gate integrated circuit (IC). In this case, the gate IC of the gate driving portion 210 can be mounted on a flexible circuit film and connected to a non-display region on a corresponding side of the display panel 100, or can be directly mounted on the non-display region.

As another example, the gate driving portion 210 can be formed directly on the substrate of the display panel 100 in a GIP (gate-in panel) type. For example, in processes of forming elements of the display panel 100, the gate driving portion 210 can be formed.

The emission driving portion 220 can receive an emission driving control signal ECS from the timing control portion 240, generate the emission control signals EM, and sequentially apply the emission control signals EM to the light emission lines EL. For example, the emission control signals EM can be sequentially output in the vertical direction from the top to the bottom in the drawing.

The emission driving portion 220 can be configured to include at least one emission IC. In this case, the emission IC of the emission driving portion 220 can be mounted on a flexible circuit film and connected to a non-display region on a corresponding side of the display panel 100, or can be directly mounted on the non-display region.

As another example, the emission driving portion 220 can be formed directly on the substrate of the display panel 100 in a GIP (gate-in panel) type. For example, in processes of forming elements of the display panel 100, the emission driving portion 220 can be formed.

The data driving portion 230 can receive image data (or output image data or compensated image data) Do and a data control signal DCS from the timing control portion 240, and in response to the data control signal DCS, can convert the image data Do into data voltages, which are analog image data, and then output the data voltages to the corresponding data lines DL by horizontal line.

Here, the data driving portion 230 can include a first driving portion 231 to a third driving portion 233 that individually correspond to and drive the first to third split regions A1 to A3.

The first to third driving portions 231 to 233 can receive first image data (or first output image data) Do1 to third image data (or third output image data) Do3 which are images data corresponding to the first to third division areas A1 to A3, respectively. The first to third driving portions 231 to 233 can convert the corresponding image data Do into the data voltages using gamma voltages and then output the data voltages.

The first to third data voltages, which are the data voltages output from the first to third driving portions 231 to 233, respectively, can be transmitted through the first to third data lines DL1 to DL3 to the first to third split regions A1 to A3, respectively.

The data driving portion 230 can be configured to include at least one data IC. In this case, the data IC of the data driving portion 230 can be mounted on a flexible circuit film and connected to a non-display region on a corresponding side of the display panel 100, or can be directly mounted on the non-display region.

Meanwhile, at least two of the above-described gate driving portion 210, emission driving portion 220, and data driving portion 230 can be configured to be integrated. For example, the gate driving portion 210 and the emission driving portion 220 can be configured in a form of an integrated circuit.

The gamma voltage portion 400 can provide a gamma voltage set VGS for converting the image data Do into the data voltages in the data driving portion 230 (or the first to third driving portions 231 to 233 of the data driving portion 230).

In this regard, for example, the gamma voltage set VGS can be configured with a plurality of gamma voltages, and the data driving portion 230 can select a gamma voltage corresponding to a value (or magnitude or gray level) of the image data Do and output it as the data voltage.

In response to a dimming signal (or output dimming signal) DIMm provided from the timing control portion 240, the gamma voltage portion 400 can generate the gamma voltage set VGS corresponding to the dimming signal DIMm, and then provide the gamma voltage set VGS to the data driving portion 230, and more specifically, commonly provide the gamma voltage set VGS to the first to third driving portions 231 to 233.

In this regard, the dimming signal DIMm is a signal that represents (or defines, adjusts, or controls) a luminance (or brightness) of the display panel 100 (or its screen). As a value (or magnitude) of the dimming signal DIMm increases, the luminance of the image displayed on the display panel 100 increases, and conversely, as the value of the dimming signal DIMm decreases, the luminance of the image decreases. Accordingly, by adjusting the dimming signal DIMm, the brightness of the screen of the display panel 100 is adjusted.

The gamma voltage portion 400 can adjust a voltage level of the gamma voltage set VGS according to the dimming signal DIMm input thereto, and more specifically, can adjust levels of the gamma voltages. For example, when the value of the dimming signal DIMm increases to increase the image brightness, the gamma voltage portion 400 can increase the voltage level of the gamma voltage set VGS and output it, and when the value of the dimming signal DIMm decreases to lower the image brightness, the gamma voltage portion 400 can decrease the voltage level of the gamma voltage set VGS and output it.

The gamma voltage portion 400 may not be provided individually for each split region (or for each driving portion of the data driving portion 230), but can be commonly provided and applied for all split regions A1 to A3 (or all driving portions 231 to 233).

In other words, the organic light emitting display apparatus 10 of this embodiment can be provided with one (or single) gamma voltage portion 400, and the gamma voltage set VGS output from the gamma voltage portion 400 can be provided in common to the first to third driving portions 231 to 233 of the data driving portion 230, and as a result, the first to third split regions A1 to A3 can be driven based on the same gamma voltage set VGS.

As such, in this embodiment, there is no need to provide a gamma voltage portion for each split region, and a number of a gamma voltage portion can be minimized, thereby reducing a cost of circuit components forming the gamma voltage portion to a minimum.

The timing control portion 240 can receive image data Di and various timing signals from an external host system through an interface such as a Low Voltage Differential Signaling (LVDS) interface, a Transition Minimized Differential Signaling (TMDS) interface, or the like. Using the timing signals, the timing control portion 240 can generate and output the data control signal DCS, the gate control signal GCS, and the emission control signal ECS to the data driving portion 230, the gate driving portion 210, and the emission driving portion 220, respectively.

Here, the input image data Di as the image data input to the timing control portion 240 can be configured with first input image data Di1 to third input image data Di3 corresponding to the first to third split regions A1 to A3, respectively.

The first to third input image data Di1 to Di3 can be processed by the timing control portion 240, and then be output as the first to third output image data Do1 to Do3, which can be supplied to the first to third driving portions 231 to 233, respectively.

Moreover, the timing control portion 240 can receive a first dimming signal (or first input dimming signal) DIM1 to a third dimming signal (or third input dimming signal) DIM3, which are diming signals (or input dimming signals) for the first to third partitions A1 to A3, respectively, from the external host system. Additionally, the timing control portion 240 can receive a driving mode signal MO, which determines whether to adjust luminance for each split region, from the host system.

In this regard, the first dimming signal DIM1 is a signal that sets (or determines or defines) the luminance of the corresponding first split region A1, and the second dimming signal DIM2 is a signal that sets the luminance of the corresponding second split region A2, and the third dimming signal DIM3 is a signal that sets the luminance of the corresponding third split region A3.

According to the first to third dimming signals DIM1 to DIM3, the luminances (or target luminances) of the corresponding first to third division regions A1 to A3 can be determined.

Regarding the driving mode signal MO, for example, the organic light emitting display apparatus 10 can be selectively driven in a normal driving mode or a luminance split mode.

The driving mode signal MO for selecting the normal driving mode or the luminance split mode can have different values (or levels) depending on the driving modes. For example, the driving mode signal MO can be configured as a 1-bit signal, and when the driving mode signal MO is "0", the normal driving mode can be selected, and when the driving mode signal MO is "1", the luminance split mode can be selected.

The normal driving mode can be, for example, a driving mode in which all split regions A1 to A3 are driven with the same luminance (or same dimming signal DIM), for example, the first to third dimming signals DIM1 to DIM3 are the same. In this case, there is no need to individually adjust the luminance for each split region.

In this case, as mentioned earlier, the split regions A1 to A3 can be driven according to the same gamma voltage set VGS, so that in the normal driving mode, the value of the input image data Di may not be processed for each split region but can be output as the output image data Do. In addition, since the input first to third dimming signals DIM1 to DIM3 are all the same, the maximum dimming signal as any one of them can be output as the output dimming signal DIMm.

Meanwhile, the luminance split mode can be, for example, a driving mode in which at least two of the split regions A1 to A3 are driven with different luminances, for example, at least two of the first to third dimming signals DIM1 to DIM3 are different from each other. In this case, there can be a need to individually adjust the luminance for each split region.

In this case as well, the split regions A1 to A3 can be driven according to the same gamma voltage set VGS, so that in order to implement the set luminance of each split region, the value of the input image data Di can be processed for each split region to generate the output image data Do. In addition, the maximum dimming signal among the input first to third dimming signals DIM1 to DIM3 can be output as the output dimming signal DIMm.

The image data processing operation and dimming signal processing operation according to the driving modes as above can be performed by a data processing portion (or image processing portion or image quality processing portion) 300 of the timing control portion 240.

The configuration and operation of the data processing portion 300 and the driving process of the organic light emitting display apparatus 10 according to the driving modes are described in more detail below.

Referring to FIG. 3 together with FIG. 1, the data processing portion 300 can include, for example, a maximum dimming signal extraction portion (or maximum luminance extraction portion) 310 and a data adjustment portion 320.

Here, the data adjustment portion 320 can include, for example, a data gain calculation portion 330, a data operation portion 340, and a bit shift portion 350. The data gain calculation portion 330 can include, for example, a luminance gain calculation portion 331 and a luminance gain-data gain conversion portion 332.

The maximum dimming signal extraction portion 310 of the data processing portion 300 can receive the first to third dimming signals DIM1 to DIM3, and extract the maximum dimming signal with the maximum value i.e., the maximum luminance among the first to third dimming signals DIM1 to DIM3 and output it as the output dimming signal DIMm.

For example, in a case where the second dimming signal DIM2 among the first to third dimming signals DIM1 to DIM3 is at a maximum, it can be extracted and used as the output dimming signal DIMm.

The output dimming signal DIMm of the maximum luminance can be transmitted to the gamma voltage portion 400. Accordingly, the gamma voltage portion 400 can generate the gamma voltage set VGS corresponding to the luminance of the split region which has the maximum luminance among the first to third split regions A1 to A3, and according to this gamma voltage set VGS, all split regions A1 to A3 can be driven.

In addition, the maximum dimming signal extracting portion 310 can also provide the output dimming signal DIMm to the data adjustment portion 320.

According to the driving mode signal MO, the data adjustment portion 320 can bypass the input image data Di and output it as is, or can individually adjust the input image data Di in order to implement each split region with the luminance of the corresponding dimming signal.

For example, when the driving mode signal MO is "0" and the normal mode is selected, the data adjustment operation of the data adjustment portion 320 can be substantially stopped, and the data adjustment portion 320 can output the input image data Di as the output image data Do without any substantial change in data value through a bypass transmission path between its input terminal and output terminal.

The output image data Do bypassed and output in this way, for example, the first to third output image data Do1 to Do3 can be transmitted, by each split region, to the corresponding first to third driving portions 231 to 233 of the data driving portion 230.

Meanwhile, when the driving mode signal MO is "1" and the luminance split mode is selected, the data adjustment portion 320 can perform the data adjustment operation by each split region.

In this regard, for example, as mentioned above, all split regions A1 to A3 can be driven according to the gamma voltage set VGS for implementing the luminance of the split region which is set to the maximum dimming signal i.e., the maximum luminance.

Thus, for the split region different from the split region of the maximum luminance, the value of the corresponding input image data Di can be adjusted to implement the luminance of the corresponding dimming signal.

For example, for the first split region A1, when the luminance of the corresponding first dimming signal DIM1 is less than the maximum luminance, in order to implement this luminance, the corresponding first input image data Di can be adjusted.

In order to perform the luminance adjustment for each split region, as mentioned above, the data adjustment portion 320 can include the data gain calculation portion 330, the data operation portion 340, and the bit shift portion 350, and the data gain calculation portion 330 can include the luminance gain calculation portion 331 and the luminance gain-data gain conversion portion 332.

The data gain calculation portion 330 can receive the first to third dimming signals DIM1 to DIM3 and the output dimming signal DIMm which is the maximum dimming signal, and use them to calculate a data gain Gd for adjusting the input image data Di by each split region.

To this end, the luminance gain calculation portion 331 of the data gain calculation portion 330 can calculate a luminance gain Gl for each split region.

In this regard, for example, each of the first to third dimming signals DIM1 to DIMm can be divided by the output dimming signal DIMm as the maximum dimming signal. Accordingly, a first luminance gain Gl1 to a third luminance gain Gl3, which are the respective luminance ratios of the first to third division areas A1 to the third division area A3 based on the maximum luminance of the maximum dimming signal can be produced.

Meanwhile, in this embodiment, the luminance gain Gl can be calculated in a form (or unit) of K bits (K is a natural number of 1 or more), which can be expressed by the following equation (1).

$$Gli = (DIMi/DIMm) * 2^K (i \text{ is } 1, 2, 3) \qquad \text{Equation (1)}$$

For example, when K=10, the luminance gain Gl can be expressed in 10 bits. In this case, for example, if the highest value that the dimming signal DIM can have is 100, the second dimming signal DIM2 is 100, and the maximum dimming signal DIMm is 100, the luminance gain Gl2 of the second split region A2 is (100/100)*210=1024.

In this way, when the luminance gain Gl is expressed in the bit form and a number of bits increases, a number of bits of the image data can be expanded in the subsequent data adjustment process, thereby enabling more detailed data adjustment.

The K-bit luminance gain Gl calculated for each split region as above can be input to the luminance gain-data gain conversion portion 332 of the data gain calculation portion 330 and then be converted into the data gain Gd.

In this regard, due to a gamma value (γ) (or gamma characteristic) of the display panel 100, the image data Di and the luminance (or dimming signal DIM) may not have a linear function relationship therebetween, but can have an exponential function relationship with the gamma value (γ) as shown in equation (2) below.

$$L = Di^{\gamma} \qquad \text{Equation (2)}$$

Accordingly, when the luminance gain Gl, which represents the luminance ratio of each of the split regions A1 to A3 based on the maximum luminance, is adjusted by directly applying it to the image data Di, the split region set to a luminance different from the maximum luminance does not correctly implement its set luminance.

Thus, in this embodiment, in order to obtain the data gain Gd as a data adjustment coefficient that can correctly implement the set luminance of the split region, the luminance gain Gl can be converted to the data gain Gd by reflecting the gamma value (γ) relationship between the luminance and the image data.

At this time, as mentioned above, since the luminance gain Gl is expressed in the form of K bits, the data gain (Gd) is also expressed in the form of K bits, which can be referred to Equation (3) below.

$$Gdi = (Gli/2^K)^{1/\gamma} * 2^K \qquad \text{Equation (3)}$$

In this way, the luminance gain Gl can be converted to the data gain Gd according to the exponential function relationship of the inverse gamma value (1/γ).

Figure 4:
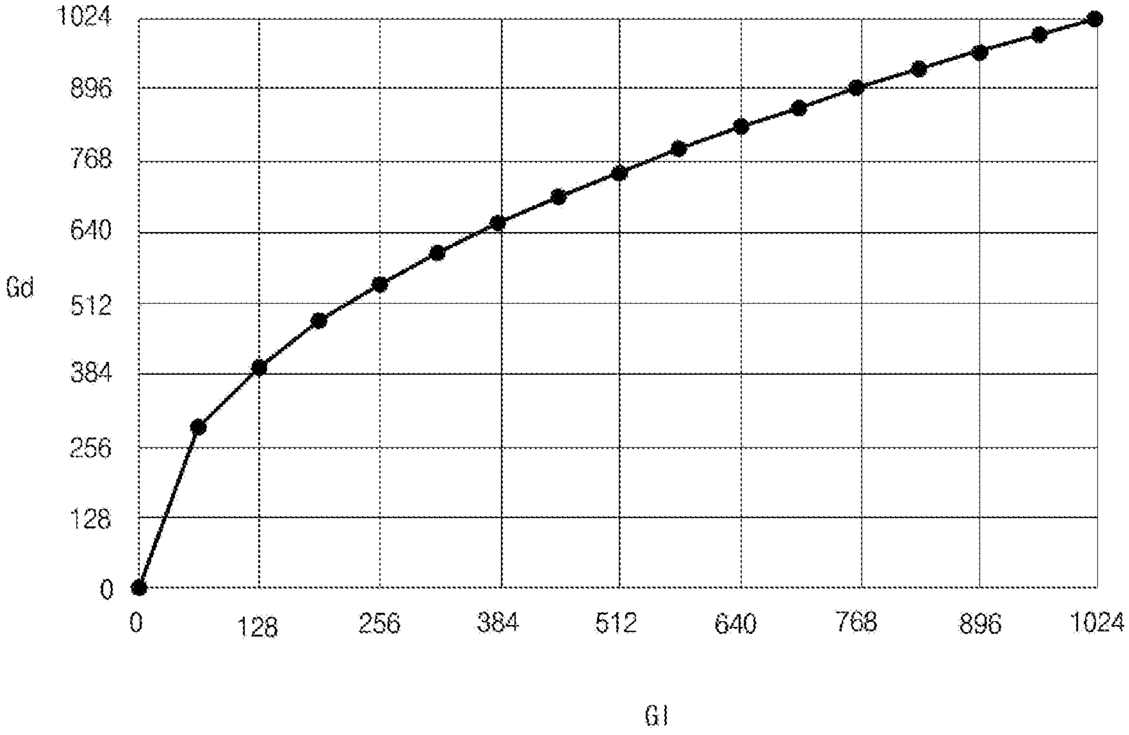
FIG. 4 is a view schematically illustrating an example of an inverse gamma value relationship between luminance gain and data gain according to an embodiment of the present disclosure.

The correlation between the luminance gain Gl and the data gain Gd in the K-bit form can be referred to FIG. 4.

By performing the above luminance gain Gl-data gain Gd conversion, the first data gain Gd1 to the third data gain Gd3, which are the respective data gains Gd for the first to third split regions A1 to A3, can be calculated.

The first to third data gains Gd1 to Gd3 for the respective split regions calculated as above can be transmitted to the data operation portion 340.

Meanwhile, regarding the calculation of the K-bit data gain Gd described above, as another example, the luminance gain Gl can be calculated in a 0-bit form with 1 as the maximum, and be converted with an exponential function of the inverse gamma value (i.e., $Gd=(Gli)^{1/\gamma}$) and then be multiplied by 2K to calculate the K-bit data gain Gd.

The data operation portion 340 can sequentially receive the first to third input image data Di1 to Di3 of the first to third split regions A1 to A3 by each horizontal line. Meanwhile, in order to distinguish the first to third input image data Di1 to Di3 in the data operation portion 340, a boundary signal indicating a vertical boundary between the split regions can be provided to the data operation portion 340. For example, the external host system can provide a first boundary signal indicating the last vertical line of the first split region A1 (i.e., the vertical line closest to the second split region A2), and a second boundary signal indicating the last vertical line of the second split region A2 (i.e., the vertical line closest to the third split region A3).

The data operation portion 340 can reflect (or apply) the first to third data gains Gd1 to Gd3 to the first to third input image data Di1 to Di3, respectively. For example, the data operation portion 340 can be formed of a multiplier, and can multiply the first to third input image data Di1 to Di3 by the first to third data gains Gd1 to Gd3, respectively.

As such, the data operation portion 340 can reflect the data gain Gd to the corresponding input image data Di by each split region. In this regard, as mentioned above, the data gain Gd can serve as the data adjustment coefficient to implement the set luminance of the corresponding split region, so that by reflecting the data gain Gd to the input image data Di by each split region, the set luminance of each split region can be accurately implemented.

Meanwhile, as mentioned earlier, the data gain Gd can be the K-bit signal, so that when the data gain Gd is applied to the input image data Di, intermediate image data (or expanded image data) (De: De1, De2 and De3) as the image data generated through this operation can have a number of bits expanded by K bits.

For example, in a case of the M-bit (e.g., 8-bit) input image data Di, the bits of the intermediate image data De can be expanded by the K bits of the data gain Gd and expressed in M+K bits.

As such, the data operation portion 340 can perform the data adjustment operation for each split region to generate and output first to third intermediate image data De1, De2, and D3*e* corresponding to the first to third split regions A1 to A3, respectively.

The bit shift portion 350 can receive the intermediate image data De and shift its M+K bits by K bits in a lower bit direction, and finally generate the M-bit output image data Do having the same number of bits as the M-bit input image data Di.

In other words, the bit shift portion 350 can perform a bit conversion operation to reduce the intermediate image data De to the M-bit image data by removing (or deleting) the lower K bits, thereby generating the M-bit output image data Do.

As such, the bit shift portion 350 can perform an operation to return the intermediate image data De, which is expanded by K bits by the K-bit data gain Gd, back to the original M-bit image data in number of bits.

The first to third output image data Do1 to Do3, which are the output image data Do output through the bit shift portion 350, can be provided to the corresponding first to third driving portions 231 to 233 of the data driving portion 230.

Hereinafter, a driving process of the organic light emitting display apparatus 10 of this embodiment according to the driving modes is described in more detail with reference to FIGS. 5 and 6.

Figure 5:
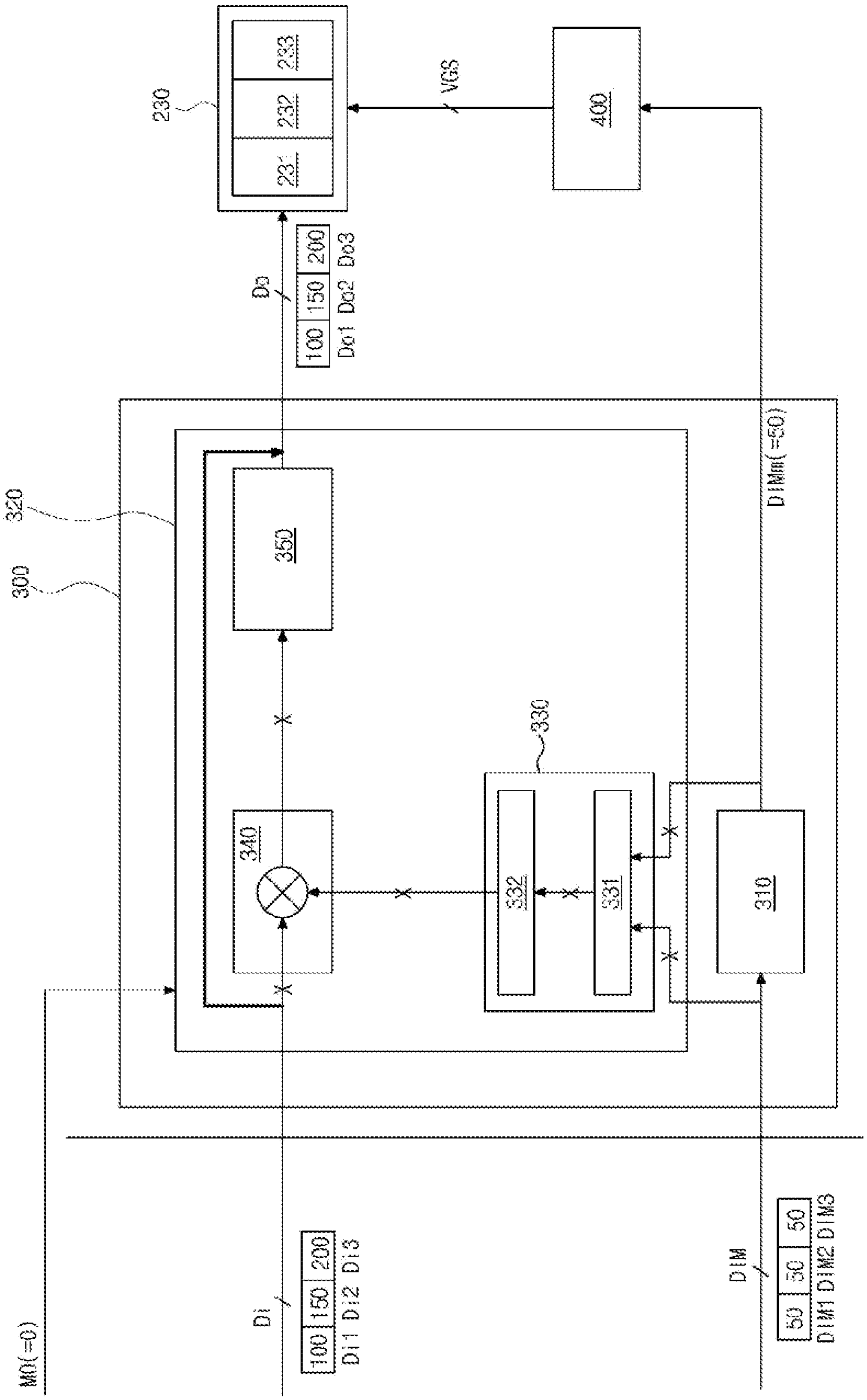
FIG. 5 is a view illustrating a driving process when an organic light emitting display apparatus according to an embodiment of the present disclosure is driven in a normal mode.

FIG. 5 is a view illustrating a driving process when an organic light emitting display apparatus according to an embodiment of the present disclosure is driven in a normal mode. FIG. 6 is a view illustrating a driving process when an organic light emitting display apparatus according to an embodiment of the present specification is driven in a luminance split mode.

First, referring to FIG. 5 in relation to the normal mode driving, the driving mode signal MO is, for example, “0” and the normal mode is selected, and in this case, the first to third dimming signals DIM1 to DIM3 respectively corresponding to the first to third split regions A1 to A3 are all the same. As an example, the first to third dimming signals DIM1 to DIM3 are all set to “50”.

In this case, as mentioned above, according to the driving mode signal MO of “0”, the data adjustment portion 320 of the data processing portion 300 can be stopped without performing the data adjustment operation, and the input image data Di can be transmitted to the data driving portion 230 through the bypass transmission path.

For example, the first to third input image data Di1, Di2, and Di3 can have M=8 bits and can have data values of “100”, “150”, and “200”, respectively. In this case, the 8-bit first to third output image data Do1, Do2, Do3, which have the same values as the first to third input image data Di1, Di2, and Di3, can be transmitted to the corresponding first to third driving portions 231 to 233.

Meanwhile, when driving in the normal mode, the maximum dimming signal extraction portion 310 of the data processing portion 300 can perform the maximum dimming signal extraction operation. At this time, since the first to third dimming signals DIM1 to DIM3 are all the same at “50”, the output dimming signal DIMm having a signal value of “50” can be generated and transmitted to the gamma voltage portion 400.

The gamma voltage portion 400 can generate the gamma voltage set VGS corresponding to the luminance of the output dimming signal DIMm thereto and commonly provide it to the first to third driving portions 231 to 233.

Each of the first to third driving portions 231 to 233 can respectively convert the first to third output image data Do1 to Do3 into the first to third data voltages using the gamma voltage set VGS, and the first to third data voltages can be respectively applied to the first to third split regions A1 to A3.

As such, when driving in the normal mode, the split regions A1 to A3 can all be set to express the same luminance, and the split regions A1 to A3 can equally implement the set luminance based on the gamma voltage set VGS corresponding to the set luminance.

Figure 6:
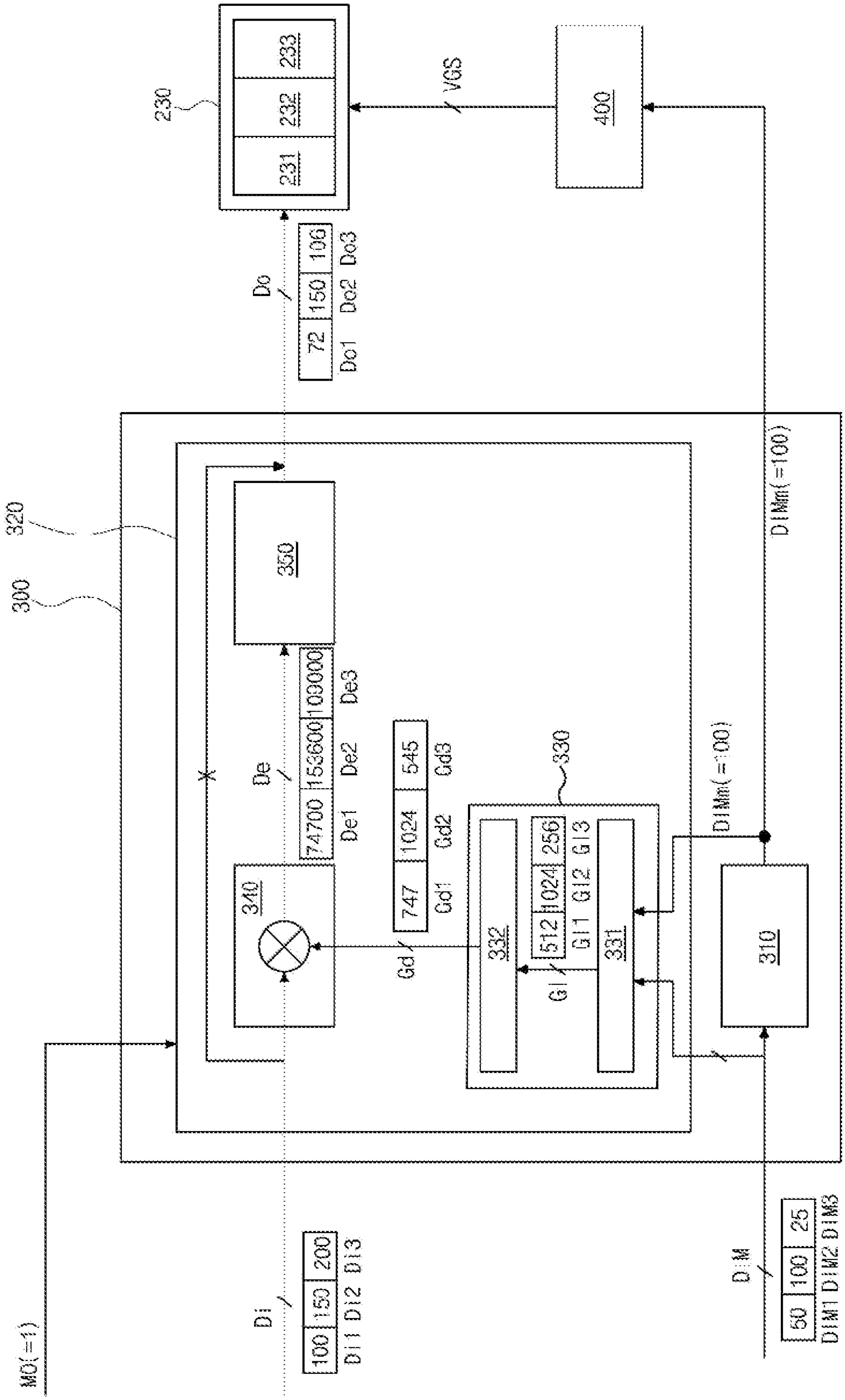
FIG. 6 is a view illustrating a driving process when an organic light emitting display apparatus according to an embodiment of the present specification is driven in a luminance split mode.

Next, referring to FIG. 6 in relation to the luminance split mode driving, the driving mode signal MO is, for example, “1” and the luminance split mode is selected. In addition, the first to third dimming signals DIM1 to DIM3 respectively corresponding to the first to third split regions A1 to A3 can be different from each other. For example, the first to third dimming signals DIM1 to DIM3 are set to “50”, “100”, and “25”, respectively, so that the luminance of the second split region A2 can be set to the highest.

In this case, as mentioned above, according to the driving mode signal MO of “1”, the data adjustment portion 320 of the data processing portion 300 can perform the data adjustment operation by each split region on the input image data Di.

Here, for example, the first to third input image data Di1, Di2, and Di3 can have M=8 bits and have data values of “100”, “150”, and “200”, respectively.

Meanwhile, when driving in the split mode, the maximum dimming signal extraction portion 310 of the data processing portion 300 can perform the maximum dimming signal extraction operation. In this regard, the first to third dimming signals DIM1 to DIM3 are "50", "100", and "25", respectively, so that the output dimming signal DIMm having a signal value of "100", which is the maximum value, can be generated and transmitted to the gamma voltage portion 400.

Moreover, the output dimming signal DIMm, which is the maximum dimming signal, can be input to the luminance gain calculation portion 331 of the data gain calculation portion 330 in order to calculate the data gain Gd.

The luminance gain calculation portion 331 can receive the first to third dimming signals DIM1 to DIM3 and the output dimming signal DIMm, and calculate the luminance gain Gl for each respective region.

In this regard, in this embodiment, a case of calculating the luminance gain Gl of K bits, for example, 10 bits is taken as an example. In this regard, according to the above-mentioned equation (1), the 10-bit first to third brightness gains Gl1 to Gl3 for the first to third split regions A1 to A3, respectively, can be calculated as follows.

$$Gl1 = (50/100) * 2^{10} = 512$$

$$Gl2 = (100/100) * 2^{10} = 1024$$

$$Gl3 = (25/100) * 2^{10} = 256$$

The 10-bit luminance gain Gl calculated by each split region as above can be input to the luminance gain-data gain conversion portion 332 of the data gain calculation portion 330 and converted into the data gain Gd.

In this regard, according to the above-mentioned equation (3), reflecting the exponential function relationship of the inverse gamma value (1/γ) between the luminance and the image data, the 10-bit first to third data gains Gd1 to Gd3 can be calculated as follows, and in this case, the gamma value (γ) is 2.2, for example.

$$Gd1 = (Gl1/2^{10})^{1/2.2} * 2^{10} = 747$$

$$Gd2 = (Gl2/2^{10})^{1/2.2} * 2^{10} = 1024$$

$$Gd3 = (Gl2/2^{10})^{1/2.2} * 2^{10} = 545$$

The data gain Gd by each split region can correspond to a data correction coefficient for implementing the set luminance of each split region based on the maximum luminance among the luminances of the split regions A1 to A3. Accordingly, by using the data gain Gd by each split region, it is possible to correctly implement the set luminance of each split region while commonly using the same gamma voltage set VGS corresponding to the maximum luminance.

The data gain Gd for each split region calculated as above can be transmitted to the data operation portion 340.

The data operation portion 340 can reflect a first data gain Gd1 to a third data gain Gd3 to the corresponding first to third input image data Di1 to Di3, respectively. For example, the data operation portion 340 can be configured of a multiplier and can multiply the first to third input image data Di1 to Di3 by the first to third data gains Gd1 to Gd3, respectively.

According to the multiplication operation of the data operation portion 340, the 8-bit input image data Di can be multiplied by the 10-bit data gain Gd to produce the 18-bit intermediate image data expanded to 18 (=8+10) bits.

In this regard, for example, the first to third intermediate image data De1, De2, and De3 can have the following data values through the multiplication operation.

$$De1 = Di1 * Gd1 = 100 * 747 = 74700$$

$$De2 = Di2 * Gd2 = 150 * 1024 = 153600$$

$$De3 = Di3 * Gd3 = 200 * 545 = 109000$$

The intermediate image data De for each split region calculated as above can be transmitted to the bit shift portion 350.

The bit shift portion 350 can receive the intermediate image data De and reduces the number of its bits by shifting the (8+10) bits by the lower 10 bits, and finally produce the 8-bit output image data Do having the same bit number as the 8-bit input image data Di.

Through the above bit shift operation, the first to third output image data Do1, Do2, and Do3 can have the following 8-bit data values.

$$Do1 = 72$$

$$Do2 = 150$$

$$Do3 = 106$$

As above, for the first split region A1 set to the luminance smaller than the maximum luminance, the first data gain Gd1 can be applied that enables the luminance of the first split region A1 to be 0.5 times the luminance of the second split region A2 which is the maximum luminance, so that the first input image data Di1 can be converted into the first output image data Do1 by adjusting the data value from 100 to 72.

Meanwhile, for the second split region A2 set to the maximum luminance, the second data gain Gd2 can be applied that enables its maximum luminance as is, so that the second input image data Di2 can become the second output image data Do2 without adjusting the data value (=150).

In addition, for the third split region A3 set to the luminance smaller than the maximum luminance, the third data gain Gd3 can be applied that enables the luminance of the third split region A1 to be 0.25 times the luminance of the second split region A2 which is the maximum luminance, so that the third input image data Di3 can be converted into the third output image data Do3 by adjusting the data value from 200 to 106.

The first to third output image data Do1, Do2, and Do3 by each split region generated as above can be transmitted to the corresponding first to third driving portions 231 to 233.

The gamma voltage portion 400 can generate the gamma voltage set VGS corresponding to the luminance of the output dimming signal DIMm (=100) input thereto, and commonly provide it to the first to third driving portions 231 to 233.

Each of the first to third driving portions 231 to 233 can convert each of the first to third output image data Do1 to Do3 into each of the first to third data voltages using the gamma voltage set VGS, and each of the first to third data voltages can be applied to the first to third split regions A1 to A3.

As such, when driving in the luminance split mode, the data gain Gd, which is the data correction coefficient for implementing the set luminance of each of the split regions A1, A2, and A3 based on the set maximum luminance of the split region A2 having the maximum dimming signal, can be calculated individually, and the data value can be adjusted by applying the data gain Gd to the input image data Di by each pixel region.

Accordingly, it is possible to correctly implement the set luminance of each split region while commonly using the gamma voltage set VGS corresponding to the maximum luminance.

As described above, according to one or more embodiments of the present disclosure, when driving in the normal mode, all split regions are set to express the same luminance, so that the data processing operation for the input image data by each split region is not performed but stopped, and the input image data can be used as the output image data. Accordingly, the set luminance of the split regions can be implemented by commonly using the gamma voltage set corresponding to the same luminance.

In addition, according to one or more embodiments of the present disclosure, when driving in the luminance split mode, the data gain, which is the data correction coefficient for implementing the set luminance of each split region based on the set maximum luminance of the split region having the maximum dimming signal, is calculated, and the data gain is applied to the input image data by each split region. Accordingly, it is possible to correctly implement the set luminance of each split region while commonly using the gamma voltage set corresponding to the maximum luminance.

Therefore, in the screen-split type display apparatus in which the screen is divided into a plurality of split regions, without the need to use a plurality of gamma voltage portions that individually drive the plurality of split regions, it is possible to commonly use a single gamma voltage portion. Accordingly, the cost of circuit components constituting the gamma voltage portion can be reduced in the present disclosure.

In addition, according to one or more embodiments of the present disclosure, without the need to separate the image data of the plurality of split regions and perform data processing through individual algorithm for each split region in the data processing portion when using a plurality of gamma voltage portions, by using the single gamma voltage portion, the image data is not separated and the data processing portion can perform data processing by each split region using the same algorithm. Accordingly, the size of the data processing portion and the number of operations of the data processing portion are reduced, thereby reducing the cost of its circuit components and realizing low-power driving.

In addition, according to one or more embodiments of the present disclosure, when driving in the normal mode, the data processing portion may not perform image data processing operation, so that higher efficiency and lower power driving can be realized.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display apparatus, comprising:

a display panel including a plurality of split regions defined by dividing a screen;

a data driving portion including a plurality of driving portions respectively corresponding to the plurality of split regions;

a gamma voltage portion configured to provide a same gamma voltage set to the plurality of driving portions; and a data processing portion including a data adjustment portion and a maximum dimming signal extraction portion, wherein the data adjustment portion processes a plurality of input image data respectively corresponding to the plurality of split regions to output a plurality of output image data to the plurality of driving portions, wherein the maximum dimming signal extraction portion provides a maximum dimming signal among a plurality of dimming signals that respectively set luminances of the plurality of split regions to the gamma voltage portion, and wherein the data adjustment portion converts a luminance gain of each of the plurality of split regions obtained based on the maximum dimming signal into a data gain, and applies each data gain to one of the plurality of input image data.

2. The display apparatus of claim 1, wherein in a normal mode where the plurality of dimming signals are the same, the data adjustment portion outputs the plurality of input image data as the plurality of output image data through a bypass transmission path, and wherein in a luminance split mode where at least two of the plurality of dimming signals are different from each other, the data adjustment portion applies each data gain to one of the plurality of input image data to output the plurality of output image data.

3. The display apparatus of claim 1, wherein each of the luminance gain and the data gain has K bits, and the input image data has M bits, where K and M are natural numbers, and wherein the data adjustment portion includes:

a data operation portion which performs a multiplication of each data gain by each of the plurality of input image data to generate a plurality of intermediate image data of M+K bits; and a bit shift portion which shifts the M+K bits of each of the plurality of intermediate image data by the K bits in a lower bit direction to generates the plurality of output image data of the M bits.

4. The display apparatus of claim 1, wherein the data adjustment portion includes a data gain calculation portion that converts the luminance gain into the data gain according to a gamma value relationship between luminance and data.

5. The display apparatus of claim 4, wherein the data gain calculation portion includes:

a luminance gain calculation portion that divides each of the plurality of dimming signals by the maximum dimming signal to calculate the luminance gain; and a luminance gain-data gain conversion portion that converts the luminance gain calculated by the luminance gain calculation portion into the corresponding data gain.

6. The display apparatus of claim 1, wherein the plurality of split regions are arranged along a horizontal line direction of the display panel.

7. The display apparatus of claim 1, wherein the display panel is an organic light emitting display panel.

8. A display apparatus, comprising:

a display panel including a plurality of split regions defined by dividing a screen;

a data driving portion including a plurality of driving portions respectively driving the plurality of split regions;

a gamma voltage portion configured to provide a same gamma voltage set to the plurality of driving portions; and a data processing portion that provides a maximum dimming signal among a plurality of dimming signals that respectively correspond to the plurality of split regions to the gamma voltage portion, wherein in a luminance split mode where at least two of the plurality of dimming signals are different from each other, the data processing portion applies each data gain to an input image data of one of the plurality of split regions to output a plurality of output image data to the plurality of driving portions, and wherein the data processing portion converts a luminance gain of each of the plurality of split regions obtained based on the maximum dimming signal into the data gain according to a luminance-data gamma value relationship.

9. The display apparatus of claim 8, wherein in a normal mode where the plurality of dimming signals are the same, the data adjustment portion outputs the plurality of input image data as the plurality of output image data through a bypass transmission path.

10. The display apparatus of claim 8, wherein each of the luminance gain and the data gain has K bits, and the input image data has M bits, where K and M are natural numbers, and wherein the data processing portion performs a multiplication of each data gain by each of the plurality of input image data to generate a plurality of intermediate image data of M+K bits, and shifts the M+K bits of each of the plurality of intermediate image data by the K bits in a lower bit direction to generates the plurality of output image data of the M bits.

11. The display apparatus of claim 8, wherein the data processing portion divides each of the plurality of dimming signals by the maximum dimming signal to calculate the luminance gain.

12. The display apparatus of claim 8, wherein the plurality of split regions are arranged along a horizontal line direction of the display panel.

13. The display apparatus of claim 8, wherein the display panel is an organic light emitting display panel.

* * * * *